(12) United States Patent
Edgar et al.

(10) Patent No.: US 10,645,442 B2
(45) Date of Patent: May 5, 2020

(54) EFFICIENT WRITE CACHE STAGING OF MULTI-CHANNEL STREAM APPENDICES

(71) Applicant: Seagate Technology LLC, Cupertino, CA (US)

(72) Inventors: Brian T. Edgar, Minneapolis, MN (US); Vasili V. Zhdankin, Prior Lake, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 25 days.

(21) Appl. No.: 16/107,863

(22) Filed: Aug. 21, 2018

(65) Prior Publication Data
US 2020/0068251 A1    Feb. 27, 2020

(51) Int. Cl.
| | |
|---|---|
| *H04N 21/433* | (2011.01) |
| *H04N 21/4335* | (2011.01) |
| *G06F 3/06* | (2006.01) |
| *G06F 12/0868* | (2016.01) |
| *G06F 12/0871* | (2016.01) |

(52) U.S. Cl.
CPC ......... *H04N 21/4334* (2013.01); *G06F 3/064* (2013.01); *G06F 3/0608* (2013.01); *G06F 3/0685* (2013.01); *G06F 12/0868* (2013.01); *G06F 12/0871* (2013.01); *H04N 21/4331* (2013.01); *H04N 21/4335* (2013.01)

(58) Field of Classification Search
CPC ........... H04N 21/4334; H04N 21/4335; H04N 21/4331; G06F 3/0608; G06F 3/064; G06F 3/0685; G06F 312/0868; G06F 312/0871
See application file for complete search history.

(56) References Cited

U.S. PATENT DOCUMENTS 7,916,421 B1    3/2011  Liikanen et al.

*Primary Examiner* — Yassin Alata
(74) *Attorney, Agent, or Firm* — Holzer Patel Drennan

(57) ABSTRACT

A method of recording data received as part of a multi-channel data stream includes writing a first subset of initially-received channel segments of a multi-channel stream to corresponding main store locations instead of a write cache while writing a second subset of initially-received channel segments of the multi-channel stream to a write cache instead of corresponding main store locations. The method further provides for writing continuation segments associated with the first and second subsets of the initially-received channel segments to the write cache and flushing a collection of same-channel segments out of the write cache responsive to a determination that the same-channel segments satisfy a coalescence condition.

20 Claims, 8 Drawing Sheets

EFFICIENT WRITE CACHE STAGING OF MULTI-CHANNEL STREAM APPENDICES

BACKGROUND

In some applications, storage devices receive and store multi-channel data streams that include sequentially intermixed packets of data of different data channels. For example, a digital video recorder (DVR) may be programmed to receive a data stream that includes packets of data for multiple different channels (e.g., TV channels). In hard drive devices with moving parts, performance may be negatively impacted when intermixed channel segments of a multi-channel data stream are written according to a sequential order of receipt, as this may entail excessive seeks of an actuator arm to disparate storage media locations associated with different data channels. In these devices, write throughput may be improved by re-ordering writes to increase the time that the actuator arm spends writing to sequential physical data blocks. However, re-ordering writes poses a burden on caching resources.

BRIEF DESCRIPTIONS OF THE DRAWINGS

SUMMARY

A method of efficient cache staging for recording data received as part of a multi-channel data stream includes writing a first subset of initially-received channel segments of a multi-channel stream to corresponding main store locations instead of a write cache while writing a second subset of initially-received channel segments of the multi-channel stream to a write cache instead of corresponding main store locations. The method further provides for writing continuation segments associated with the first and second subsets of the initially-received channel segments to the write cache and flushing a collection of same-channel segments out of the write cache responsive to a determination that the same-channel segments satisfy a coalescence condition.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

Figure 1:
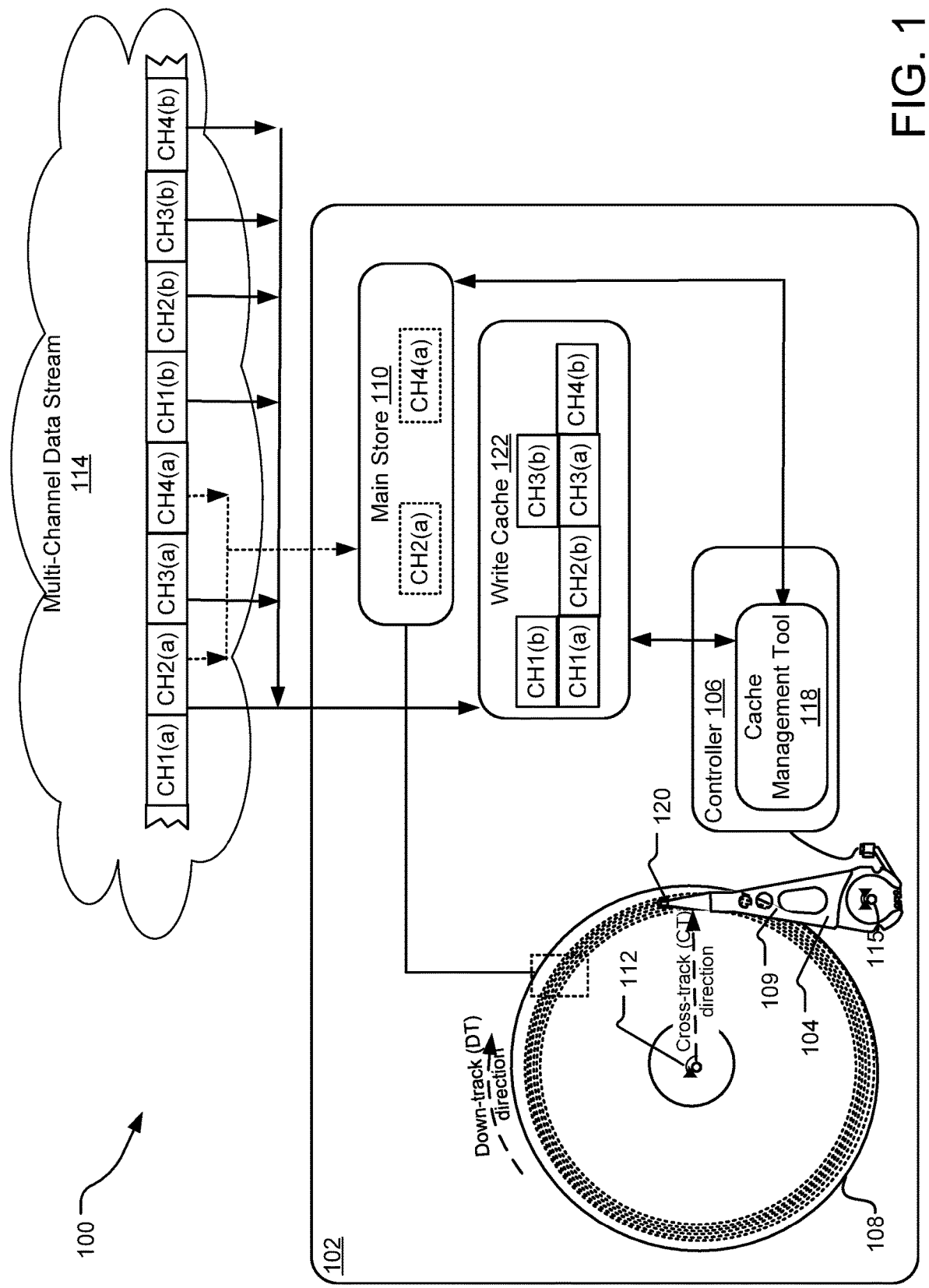
FIG. 1 illustrates an example storage system that implements efficient cache staging techniques to increase write throughput when recording data received as part of a multi-channel data stream.

FIG. 1 illustrates an example storage system 100 that implements efficient cache staging methodology to increase write throughput when recording data received as part of a multi-channel data stream 114. The storage system 100 includes a storage device 102 including a storage medium 108 and a storage controller 106. During recording operation, the storage device 102 receives the multi-channel data stream 114 from a host system. In one implementation, the host system is a broadcast provider such as a satellite, cable TV, or other broadcast provider that transmits multiple different data channels (e.g., of digital media) in the multi-channel data stream 114. As used herein, a "channel" refers to an individual stream of data which may be included within a multi-channel data stream. In the case of digital content channels, a continuous portion of an individual channel can be viewed and/or listened to when the channel data is read back from the storage medium 108 according to a defined order (e.g., a sequential order of receipt). A digital content item is, for example, a data stream including video and/or audio data, such as a movie, TV show, commercial, audio clip, etc.

In the following disclosure, two channel segments of a same channel are referred to as "continuous channel segments" if one of the channel segments appends to data of the other channel segment (e.g., the two segments are intended to be read and/or played consecutively when data is played back from the storage medium 108). In the event where the channel segments include video data, data spanning two continuous channel segments can be played back to view a continuous video segment of a digital content item. Similarly, a first channel segment is said to be a "continuation" or an "appendix" of a second channel segment, such as a previously-received and/or recorded channel segment, if the second channel segment appends the data of the first channel segment, such as when the two channel segments include data of a same channel and/or a same digital content item and are intended to be read and played consecutively.

In one implementation, the multi-channel data stream 114 includes data of multiple broadcast channels, such as different television channels or different recorded streams of security footage from different security cameras. For example, the storage device 102 may be included within a digital video recorder (DVR) or set-top box designed to record live broadcasts of multiple channels and/or save on-demand content for subsequent viewing by a user.

Although other implementations are contemplated, the storage medium 108 is, in FIG. 1, a magnetic storage disk on which data bits can be recorded using a magnetic write pole and from which data bits can be read using a magnetoresistive element (not shown). The storage medium 108 rotates about a spindle center or a disc axis of rotation 112 during rotation and includes an inner diameter and an outer diameter between which are a number of concentric data tracks. Information may be written to and read from data bit locations in the data tracks using read/write element(s) on a transducer head assembly 120, which is further mounted on an actuator assembly 104 at an end distal to an actuator axis of rotation 115. The transducer head assembly 120 flies in close proximity to the surface of the storage medium 108 while the storage medium 108 rotates about the axis of rotation 112. When reading data from or writing data to various locations on the storage medium 108, the actuator assembly 104 rotates about the actuator axis of rotation 115 to position the transducer head assembly 120 over a target data track.

The controller 106 of the storage device 102 includes software and/or hardware for implementing data access commands (e.g., read and write commands) to targeted locations on the storage medium 108. To facilitate execution of such commands, the controller 106 manages a mapping of host logical block addresses (LBAs) to corresponding physical data blocks on the storage medium 108. The range of physical data blocks included within the LBA mapping scheme is referred to herein as a "main store." For example, FIG. 1 illustrates a portion of main store 110.

In one implementation, continuous channel segments within each individual channel of the multi-channel data stream 114 are associated with consecutively-accessible LBAs (e.g., consecutive LBAs mapped to consecutive physical data blocks). For example, continuous segments of a first channel are associated with LBAs 1010, 1020, 1030; continuous segments of a second channel are associated with LBAs 2010, 2020, 2030; continuous segments of a third channel are associated with LBAs 3010, 3020, 3030; and continuous segments of a fourth channel are associated with LBAs 4010, 4020, and 4030.

In these cases where the LBA numbering is consecutive across continuous segments of individual channels, the segments arriving within the multi-channel data stream 114 may be of non-sequential LBA order. For example, the multi-channel data stream 114 includes intermixed channel segments of data from four different channels—CH1, CH2, CH3, and CH4. If these channels are individually assigned to the above-described exemplary sequential LBA ranges, the storage device 102 receives the stream data according to a non-consecutive LBA order: 1010, 2010, 3010, 4010, 1020, 2020, 3020, 4020, 1030, 2030, 3030, 4030. In systems where consecutive LBAs are mapped to consecutive physical data blocks, it is inefficient to write a non-sequential LBA stream such as this according to the order of data receipt because this causes the storage device 100 to perform a large number of radial seeks moving the actuator arm 109 to the various storage locations corresponding to the start LBA of each channel segment. This provides an incentive to increase the length of each LBA-consecutive write during recordation of the incoming multi-channel data stream 114. For example, greater write throughput can be realized when sequentially-received LBAs 1010, 2010, 1020 are temporally cached in memory, re-arranged, and written according to the LBA-consecutive order 1010, 1020, and 2010.

By rearranging and coalescing same-channel segments (also referred to herein as "stream appendices") in the above-described manner, LBAs located physically one another can be written sequentially to yield a corresponding decrease in the total time that the actuator arm 109 spends seeking to the LBA location of each different channel segment.

The above-described performance benefits are, in many cases, dependent upon the existence of a write cache of sufficient size to accommodate staging and coalescing of data from each different channel within the multi-channel data stream 114. The herein disclosed technology provides write cache staging techniques that permit for the use of a smaller write cache to support the staging and coalescing of an increased number of data channels.

For purposes of this disclosure, it is assumed that the controller 106 includes a mechanism for identifying which channels the individual data packets within the multi-channel data stream 114 correspond to. It can be appreciated that channel identifiers for the different incoming data packets can be determined in several different ways. In one implementation, each different channel is pre-associated with a defined LBA range and the channel ID for a data segment can be determined based on the host-specified LBA associated with the data segment. In another implementation, a channel ID for each channel segment can be determined based on the size of the associated segment, such as in implementations where the different data packet sizes are used in association with each channel. In the same or another implementation, the channel segments are received according to an expected order. In the example of FIG. 1, the data segments in the multi-channel data stream 114 are arranged according to a repeated sequence (e.g., CH1, CH2, CH3, CH4, CH1, CH2, CH3, CH4, and so on) but may, in other implementations, be received according to a different order. In still other implementations, the data segments within the multi-channel data stream 114 include header information indicating a channel identifier for each data packet.

In the examples used herein, lower-case alphabetical letters (a, b, c, d, etc.) are used to denote a sequential index of each individual segment within an associated channel stream. For example, CH1($a$) represents an initially-received segment of channel 1, while CH1($b$) represents a continuation segment that appends directly to CH1($a$). Although not shown in FIG. 1, this notation may be continued such that CH1($c$) denotes a continuation segment of CH1($b$), CH1($d$) denotes a continuation segment of CH1($c$), and so on.

A first-received data segment associated with each data channel is referred to herein as the "initially-received channel segment." In FIG. 1, the data segments CH1($a$), CH2($a$), CH3($a$), and CH4($a$) represent initially-received channel segments for each of the associated data channels 1-4. As used herein, the term "initially-received channel segment" may be used to refer to either an actual first-received data segment for a particular channel or, alternatively, to a first-received segment for the associated channel that occurs after a defined event such as a temporary lapse in broadcast and/or receipt of the multi-channel data stream 114.

As each data segment of the multi-channel data stream 114 arrives at the storage device 102, the data segment is placed into a volatile memory buffer (not shown). A cache management tool 118 of the controller 106 dynamically selects initial non-volatile storage locations for each channel segment according to the order that the channel segments are received within the multi-channel data stream 114.

In one implementation, the cache management tool 118 determines a channel ID associated with each received channel segment and also determines whether that segment is an initially-received segment for the associated channel ID. The cache management tool 118 selects a storage location for each initially-received channel segment (e.g., CH1($a$), CH2($a$), CH3($a$) or CH4($a$) based on the channel ID associated with each channel segment. If the associated channel ID identifies a channel included within a first predetermined subset of data channels, the data segment is initially written to a storage location in the main store 110 without first being recorded in a write cache 122. If, in contrast, the associated channel ID identifies a channel included within a second predetermined subset of data channels, the data segment is written to a storage location in the write cache 122 rather than to the main store 110. In various implementations, the write cache 122 may be either volatile (e.g., RAM, S-RAM, DRAM, etc.) or non-volatile (e.g., Flash memory, EPROM, F-RAM, M-RAM, disk memory, etc.)

The above-described selective placement of the initially-received channel segments in either the write cache 122 or the main store 110 effectively sets-up a time-staggered channel staging and segment coalescence process, the benefits of which are described further below.

In one example of the above-described process, approximately half of the initially-received data segments are directed to the main store 110 while the other half are directed to the write cache 122. For example, the cache management tool 118 identifies CH1(a), CH2(a), CH3(a), and CH4(a) as initially-received channel segments of the associated channels (1-4). The cache management tool 118 determines that CH2 and CH4 are associated with a first subset of channels and, based on this determination, writes the segments CH2(a) and CH4(a) directly to the main store 110. Further, the cache management tool 118 determines that CH1 and CH3 are associated with a second subset of channels and, based on this determination, writes the segments CH1(a) and CH3(a) to the write cache 122 rather than the main store 110. After the first four data segments of the multi-channel data stream 114 are written, CH2(a) and CH4(a) reside in the main store 110 while the segments CH1(a) and CH3(a) reside in the write cache 122.

In other implementations, the proportion of initially-received channel segments initially written to the main store 110 instead of the write cache 122 may be greater or fewer than half.

After the cache management tool 118 writes the initially-received segment of each data channel (e.g., CH1(a), CH2(a), CH3(a), and CH4(a)) to either the non-volatile cache 122 or to a corresponding location in the main store 110, the storage device 102 begins to receive continuation segments for each of the channels. Based on an identified channel ID and/or write history information, the cache management tool 118 identifies each of these subsequently-received segments as being a continuation segment that appends to an already-recorded channel segment. The cache management tool 118 writes each of the continuation segments in the multi-channel data stream 114 to the write cache 122. For example, the cache management tool 118 recognizes each of the segments CH1(b), CH2(b), CH3(b) and CH4(b) as being a continuation segment of an associated one of the initially-received segments CH1(a), CH2(a), CH3(a), CH4(a) and writes each of these continuation segments, in turn, to the write cache 122 (as shown).

As data begins to accumulate in the write cache 122, the cache management tool 118 monitors cache contents to identify whether same-channel data (for any channel) residing in the write cache 122 satisfies a coalescence condition. In one implementation, the coalescence condition is satisfied when there exists a threshold number of same-channel segments residing in the non-volatile wrote cache 122. For example, channel 2 satisfies the coalescence condition when there exist a threshold number of continuous channel 2 segments (e.g., CH1(a), CH1(b) residing in the write cache 122. In another implementation, the coalescence condition is satisfied when a total amount of data residing in the cache exceeds a threshold.

Responsive to a determination that the coalescence condition is satisfied, the cache management tool 118 coalesces same-channel segments of a select channel into a single LBA-consecutive data segment and flushes this coalesced same-channel data segment out of the write cache 122 and to corresponding LBA locations in the main store 110, freeing up space within the write cache 122 for new incoming data. The "select channel" that is coalescence and flushed from the write cache 122 depends on the defined coalescence threshold. If, for example, the coalescence threshold is satisfied when same-channel segments collectively satisfy a threshold data quantity (or segment number), the select channel is the channel that has same-channel segments independently satisfying the coalescence condition. If, alternatively, the coalescence condition is defined as being satisfied when a total amount of data (of all channels) residing the cache exceeds a threshold, the select channel may be the channel having the largest amount of continuous channel data in the write cache 122.

In one implementation where the order of expected future segment arrival is known (e.g., CH1, CH2, CH3, CH4, CH1, CH2, CH3" rather than a random order), the select channel that is coalesced and flushed is the channel having an amount of channel data satisfying a threshold that is also expected to be next appended to at a time that is furthest in the future. If, for example, segments are received in the order CH 1, CH2, CH3, CH4, CH5, CH6, CH7, CH8 and three of these channels have a threshold number of continuous channel segments in the write cache 122, the cache management tool 118 selects the channel that is expected to next update at a time furthest in the future. Data of this select channel is coalesced and flushed to the main store 110, thus ensuring that the freed space in the cache remains available for a longest possible amount of time.

In some implementations, satisfaction of the coalescence condition triggers a coalescence and flush of same-channel segments of multiple different channels. If, for example, current available cache capacity decreases below a set threshold, two or more channels having the largest quantity of continuous channel data may be selected, independently coalesced, and flushed from the write cache 122.

In one implementation, segments of coalesced same-channel data are written to the main store 110 in an LBA consecutive order. Consequently, the associated same-channel data can be read back continuously, such as to enable an ordered playback of single-channel data without performing any radial seeks of the actuator arm 109 except to enable normal switches between adjacent data tracks.

The write cache 122 of FIG. 1 is shown storing six different data segments (CH1(a), CH1(b), CH2(b), CH3(a), CH3(b), CH(2)(b)). This is intended to convey that these segments are—in this example—each initially written to the write cache 122 rather than their associated LBA locations in the main store 110. Notably, these segments are not necessarily stored simultaneously in the write cache 122. If, for example, the coalescence condition is satisfied when there exist two continuous channel segments in the write cache 122, the write cache 122 may not store all six of these segments at once. Rather, CH1(a) and CH1(b) may be coalesced and flushed out of the cache before CH2(b), CH3(b) or CH4(b) are received and/or written to the write cache 122. Thus, in this specific example with four data channels and a coalescence condition satisfied by two continuous channel segments, the write cache 122 may store no more than four channel segments at any given time. In other examples where the coalescence conditions provide higher thresholds (e.g., 3, 4, 5, 6, etc. continuous channel segments) and/or greater numbers of channels included within the multi-channel stream, the write cache may store greater than four channel segments at once.

Since some of the initially-received channel segments were placed in the main store 110 instead of the write cache 122 (e.g., segments CH2(a) and Ch4(a) were written directly to the main store 110), the above-described same-channel segment coalescence is effectively staggered for different data channels. That is, the coalescence condition is satisfied sooner for the data channels having initial data segments that were placed in the write cache 122 (e.g., CH1, CH3) than for the data channels having initial data segments written directly to the main store 110 (e.g., CH2, CH4).

For example, in FIG. 1, two channel 1 segments (CH1(a) and CH1(b)) are written to the write cache 122 before any CH2 segments (e.g., because the initially-received CH2 segment (CH2(a)) is written to the main store 110 instead). In the above example where the coalescence condition is satisfied by two continuous same-channel segments in the write cache 122, the first two CH1 segments can therefore be coalesced and flushed from the write cache before the first channel segment of CH2 is placed in the cache. Likewise, if the coalescence condition is satisfied when there exist three continuous channel segments in the write cache 122, three CH1 segments may be received and coalesced before the second CH2 segment is initially placed in the write cache 122. No matter what coalescence condition is utilized, this channel-staggered caching methodology can be supported by a write cache with a smaller total storage capacity than a write cache needed to support a similar same-channel coalescence methodology that does not stagger the initial placement of data from different channels in the write cache.

As mentioned above, the storage controller 105 may flush same-channel segments from the write cache 122 when a threshold number of simultaneously-cached same-channel segments satisfies a coalescence condition In one implementation, the write cache 122 has a size that is insufficient to simultaneously store this threshold number of data segments (e.g., the number sufficient to satisfy the coalescence condition) for all of the channels in the multi-channel stream 114. If, for example, the coalescence condition is two and there exist four data channels within the multi-channel stream (as in the illustrated example), the write cache 122 may be sized to store fewer than eight (e.g., two times four channels) of the data segments at once.

In general, performance of the storage device 102 increases in proportion to the average size of each write to the main store 110. When larger chunks of data are coalesced within the write cache 122 prior to flushing, greater increases in performance are observed.

In an implementation with equal-sized channel segments that does not employ the herein-described "staggering" of cache writes on the initial pass, an average write size of two segments is generally observed when the write cache 122 is sized to N channel segments, where N is the number of channels in the multi-channel data stream 114. In contrast, the same or similar average write size can be achieved using a much smaller write cache using the disclosed write cache staggering methodology (e.g., with staggering on the initial pass).

Depending on the coalescence condition and select size of the write cache 122, the disclosed caching techniques may lead to variable improvements in device performance. In one example system implementing the above-disclosed caching methodology, an average write size of two channel segments is observed when the write cache 122 is sized to hold a maximum of N/2 segments of equal size, where N represents the number of channels in the multi-channel data stream 114. In still another example system implementing the above-disclosed caching methodology, an average write size of three channel segments is observed when the write cache 122 is sized to hold a maximum of N segments of equal size. In yet still another example system implementing the above-disclosed caching methodology, an average write size of 2*m is observed for a write cache 122 sized to hold m*N channel segments.

Notably, the controller 106 may include software or a combination of software and hardware and may be implemented in any tangible computer-readable storage media within or communicatively coupled to the storage device 100. The term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

FIG. 2A-2F illustrate a storage device 200 executing various steps of a time-staggered caching and data coalescence process that increases write throughput when recording data received as part of a multi-channel data stream 202. In the examples illustrated by these figures, the multi-channel data stream 202 is shown to include intermixed segments of channel data associated with four different channels. Notably, four channels are shown for conceptual illustration and simplicity. The multi-channel data stream 202 may, in other implementations, include fewer than or greater than four channels.

Figure 2A:
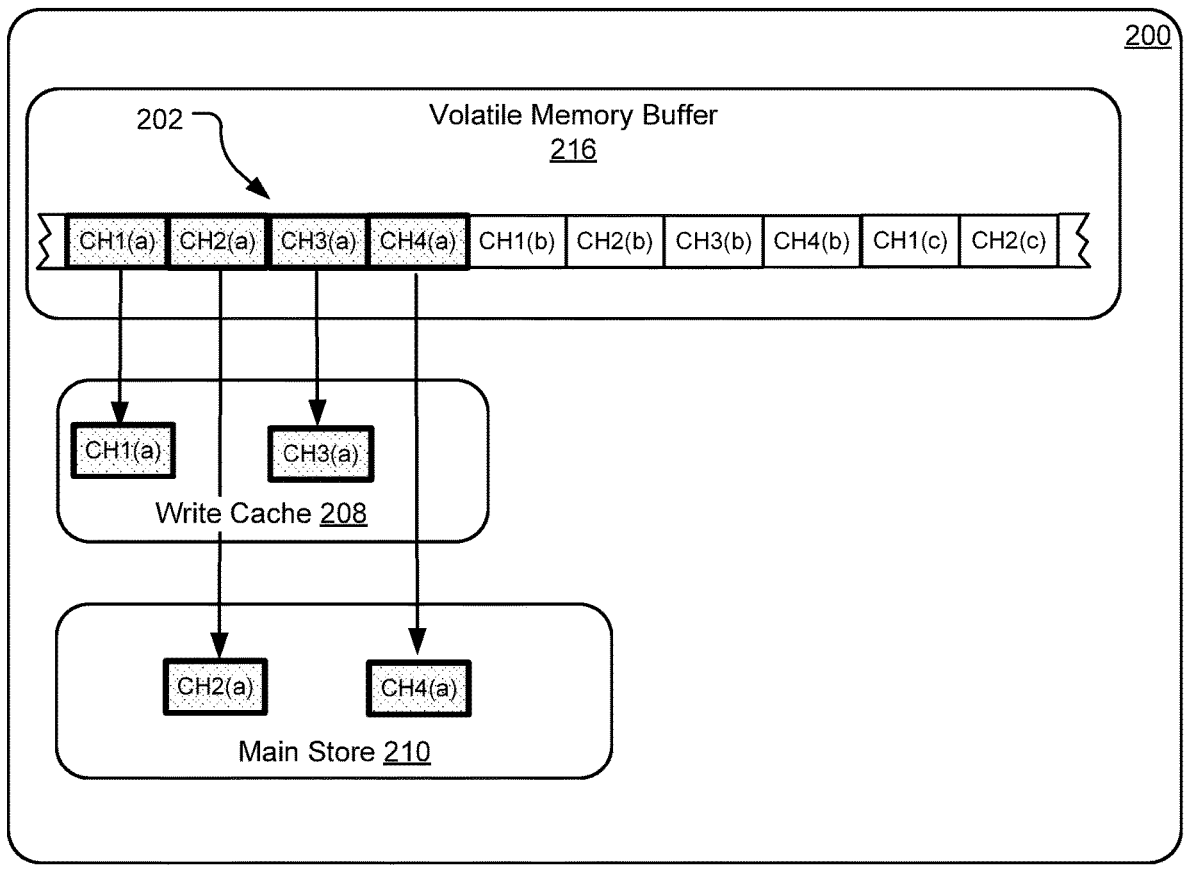
FIG. 2A illustrates a storage device receiving and recording initial data segments of a multi-channel stream as part of an example process for efficient write cache staging.

FIG. 2A illustrates a storage device 200 during a phase in which the storage device 200 receives and stores an initial data segment for each data channel included in the multi-channel stream 202. As data packets of the multi-channel data stream 202 are received at the storage device 200, they are placed into a volatile memory buffer 216. A controller (not shown) of the storage device copies each of the segments—according to a sequential order of receipt—to a non-volatile storage location that is either within a main store 210 of the storage device 200 or within a write cache 208 of the storage device 200. In one implementation, the write cache 208 is a non-volatile memory cache separate from one or more storage media including the main store 210. For example, the main store 210 may be distributed across one or more magnetic disks and the write cache 208 may be located in DRAM or Flash memory.

As each channel segment (CH1(a), CH2(a), etc.) is received at the storage device 200, the controller of the storage device determines a channel ID associated with the data segment and further identifies whether or not the segment is an initially-received segment for the associated channel. In the illustrated implementation, CH1(a), CH2(a), CH3(a), and CH4(a) each represent an initially-received data segments for corresponding channels 1, 2, 4, and 4, respectively.

Responsive to identification of a channel segment as being an initially-received segment for an associated data channel, the controller further determines whether the data segment is associated with a data channel belonging to a pre-identified subset of channels. If the data segment is identified as belonging to the pre-identified subset of channels, the controller initially writes the data segment to a corresponding location in the main store 210. If, in contrast, the data segment is not identified as belonging to the pre-identified subset of channels, the controller initially writes the data segment to the write cache 122, effectively postponing an initial write of the data segment to the main store 210.

In the illustrated example, channels 2 and 4 are included in the pre-identified subset of channels, while channels 1 and 3 are excluded from this pre-identified subset. Consequently, the controller writes the initially-received segments CH2(a) and CH4(a) to corresponding locations in the main store 210 (e.g., to locations statically or dynamically mapped to host-assigned LBAs the controller). The initially-received segments CH1(a) and CH3(a) are, in contrast, initially written to the write cache 208 in lieu of the main store 210.

Figure 2B:
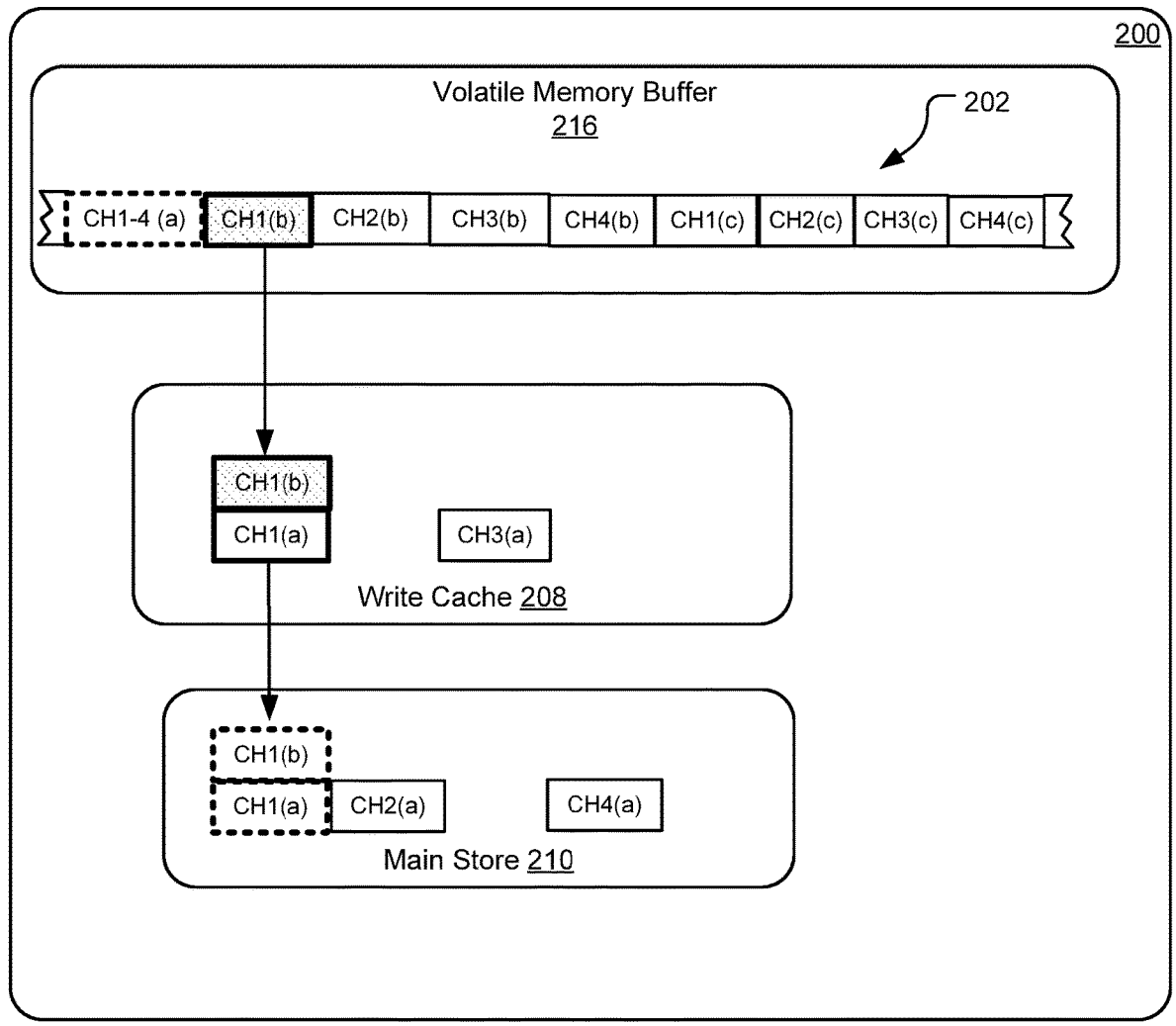
FIG. 2B illustrates the storage device of FIG. 2A performing a data recordation operation during the example process for efficient write cache staging.

FIG. 2B illustrates the storage device 200 during a data recordation operation performed following the operations shown and described with respect to FIG. 2A. Here, the storage device determines an initial non-volatile storage location for a first continuation segment (CH1(b)) received for channel 1 that is part of the multi-channel data stream 202. In one implementation, the segment CH1(b) includes data that logically appends to data of the initially-received channel segment for channel 1 (e.g., CH1(a)). The controller of the storage device 200 recognizes the segment CH1(b) as being a continuation segment and, based on this determination, records the segment CH1(b) within the write cache 208.

Following the write of the segment CH1(b) to the write cache 208, the controller assesses the contents of the write cache 208 and determines whether same-channel data residing in the write cache 208 satisfies a coalescence condition. In different implementations, the coalescence condition may be satisfied by different criteria. In one implementation, the coalescence condition is satisfied when there exist a predetermined number of channel segments for any individual channel simultaneously residing in the write cache 208. In another implementation, the coalescence condition is satisfied when there exists a predetermined quantity of data of any one channel simultaneously residing in the write cache 208 irrespective of the number of individual data segments such data corresponds to. In yet another implementation, the coalescence condition is satisfied by impending overflow of write cache capacity. For example, a largest continuous channel set may be flushed from the write cache 208 when a total amount of cached data exceeds a threshold. If there exist multiple channel sets of equal size, the channel set selectively flushed may, in some implementations, be the channel set for the next segment is expected to arrive the furthest in the future.

In the example illustrated in FIGS. 2A-2F, the coalescence threshold is two; however, the coalescence threshold may take on different values greater than two in different implementations. Further, the example of FIGS. 2A-2F implements an identical coalescence threshold for each of the different channels. Notably, however, some implementations of the disclosed technology may implement different coalescence thresholds for different channels.

This may be the case when, for example, data packets of different channels are of unequal size.

Following the placement of the segment CH1(b) in the write cache 208, there exist two continuous CH1 segments in the write cache 208. In this example, the exemplary coalescence threshold of two segments is now satisfied. Consequently, the same-channel continuation segments (CH1(a) and CH1(b)) are flushed out of the write cache 208 and written to corresponding LBA locations in the main store 210. In one implementation, the flushing of the same-channel continuation segments is performed by executing a single continuous write operation that writes the associated data according to physical data blocks according to a consecutive LBA order. For example, the data segments CH1(a) and CH1(b) are written to the main store 210 in a write operation that is performed without any radial seeks of an actuator arm except to enable normal switches between adjacent data tracks.

Following the flush of the continuation segments CH1(a) and CH1(b) to the main store 210, the channel segment CH3(a) is the sole channel segment residing in the write cache 208 that has not yet been copied to its corresponding LBA location in the main store 210.

Figure 2C:
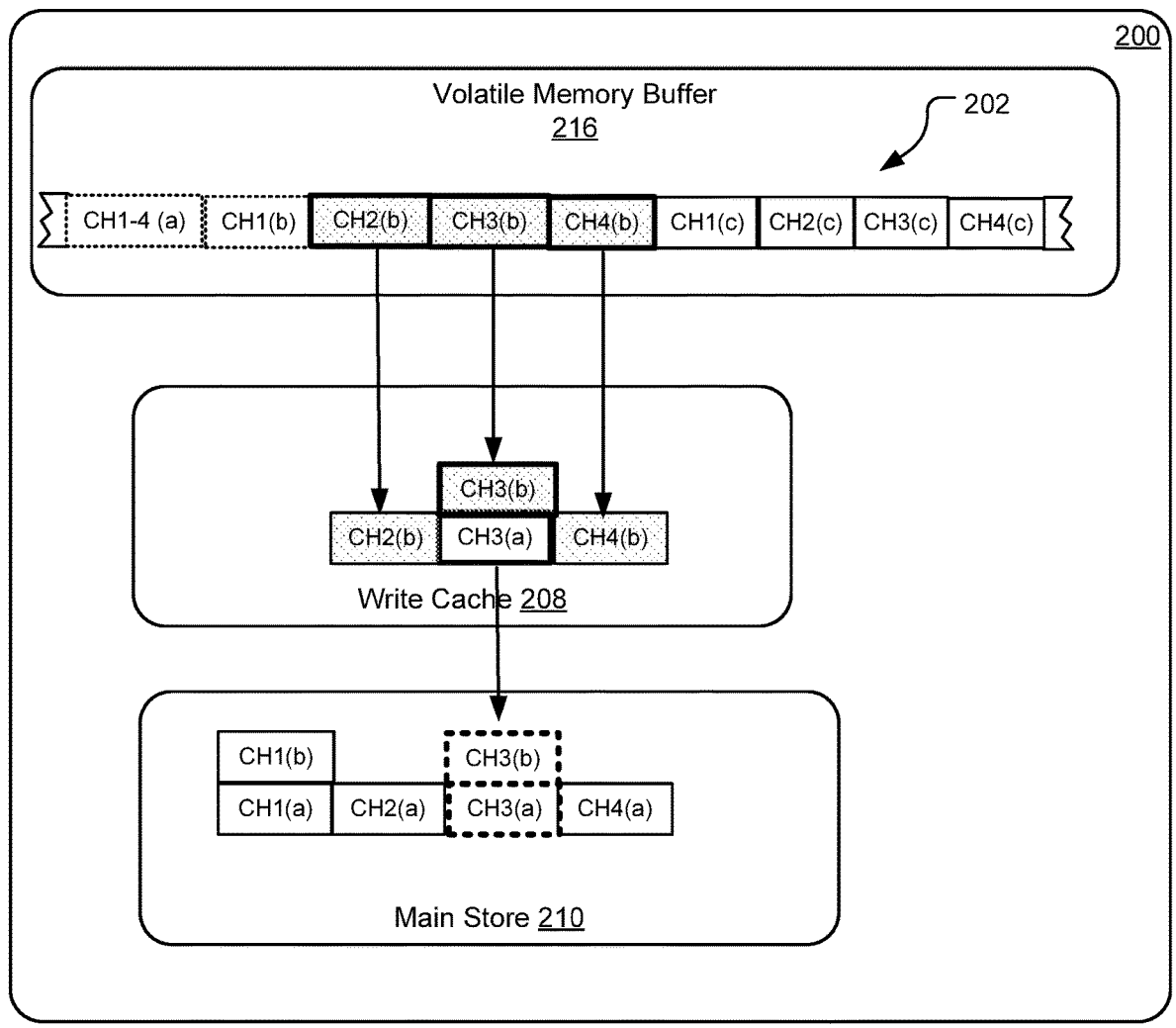
FIG. 2C illustrates the storage device of FIG. 2A-2B performing another data recordation operation during the example process for efficient write cache staging.

FIG. 2C illustrates the storage device 200 during data recordation operations performed following the operations shown and described with respect to FIG. 2B. Here, the storage device determines initial non-volatile storage locations for the next three sequentially-received channel segments (CH2(b), CH3(b), CH4(b)) that are included within the multi-channel data stream 202 and pending in the volatile memory buffer 216. Responsive to a determination that these segments are continuation segments (as opposed to initially-received channel segments), the controller selectively writes each of these segments to the write cache 208 in the order that the segments are received as part of the multi-channel data stream 202 (e.g., the order CH2(b), CH3(b), and CH4(b)).

Following the write of the segment CH3(b) to the write cache 208, the controller determines that the number of LBA-continuous CH3 segments residing in the write cache 208 satisfies the coalescence threshold. Consequently, the same-channel continuation segments (CH3(a) and CH3(b)) are flushed out of the write cache 208 and written to corresponding LBA locations in the main store 210. The other two newly-written segments (Ch2(b) and CH4(b)) remain within the write cache 208.

Figure 2D:
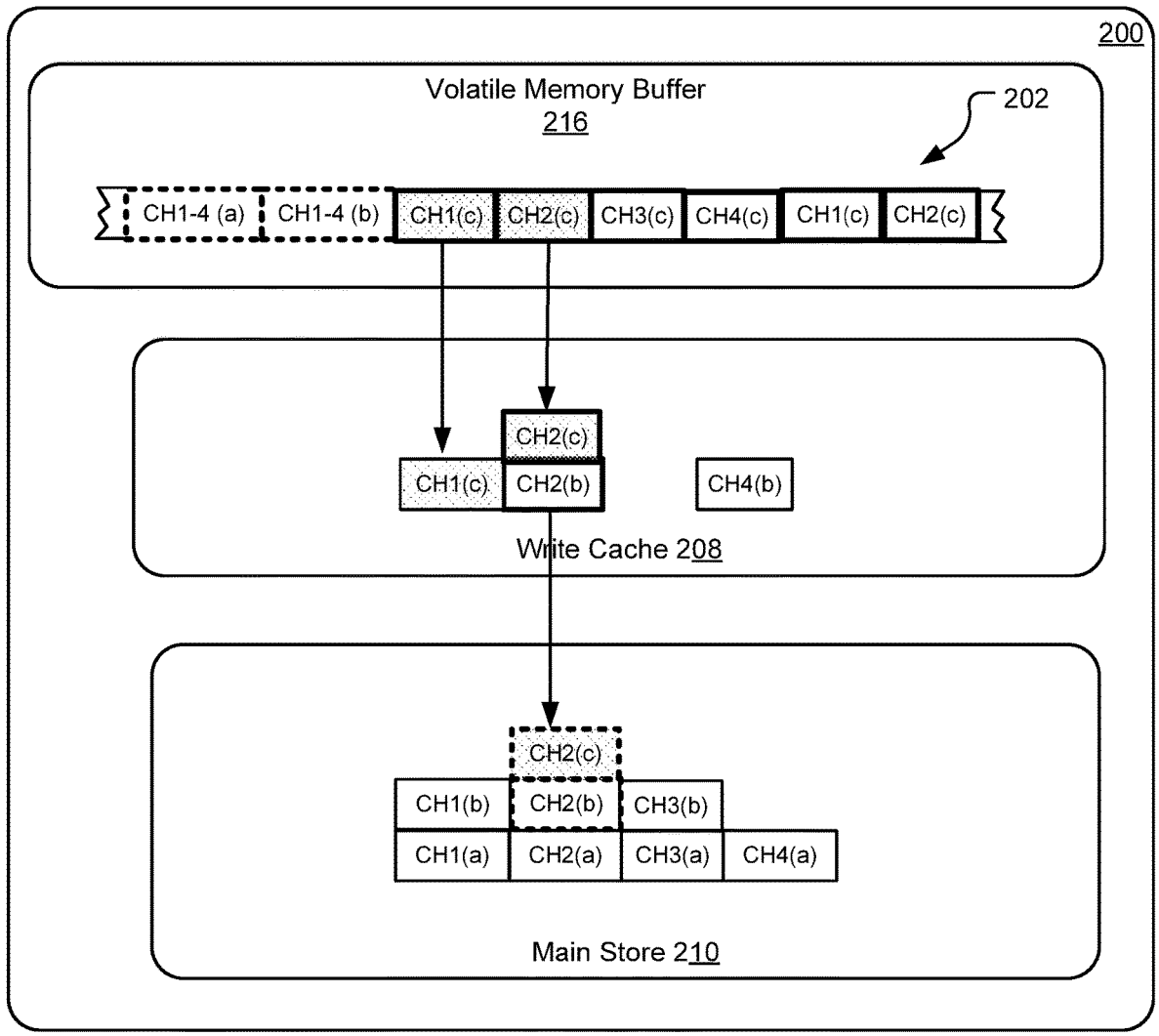
FIG. 2D illustrates the storage device of FIG. 2A-2C performing yet another data recordation operation during the example process for efficient write cache staging.

FIG. 2D illustrates the storage device 200 during data recordation operations performed following the operations shown and described with respect to FIG. 2C. Here, the storage device determines initial non-volatile storage locations for the next two sequentially-received channel segments (CH1(c) and CH2 (c)) that are included within the multi-channel data stream 202 and pending in the volatile memory buffer 216. Responsive to a determination that these segments are continuation segments that append data to earlier-written channel segments, the controller selectively writes each of these segments to the write cache 208.

Following the write of the segment CH2(c) to the write cache 208, the controller determines that a current number of continuous CH2 segments residing in the write cache 208 satisfies the coalescence threshold. Consequently, these same-channel continuation segments (CH2(b) and CH2(c)) are flushed out of the write cache 208 and written to corresponding LBA locations in the main store 210, freeing up addition space in the write cache 208. Following this flush, the segments CH1(c) and CH4(b) remain in the write cache but have not yet been copied to corresponding permanent storage locations in the main store 110.

Figure 2E:
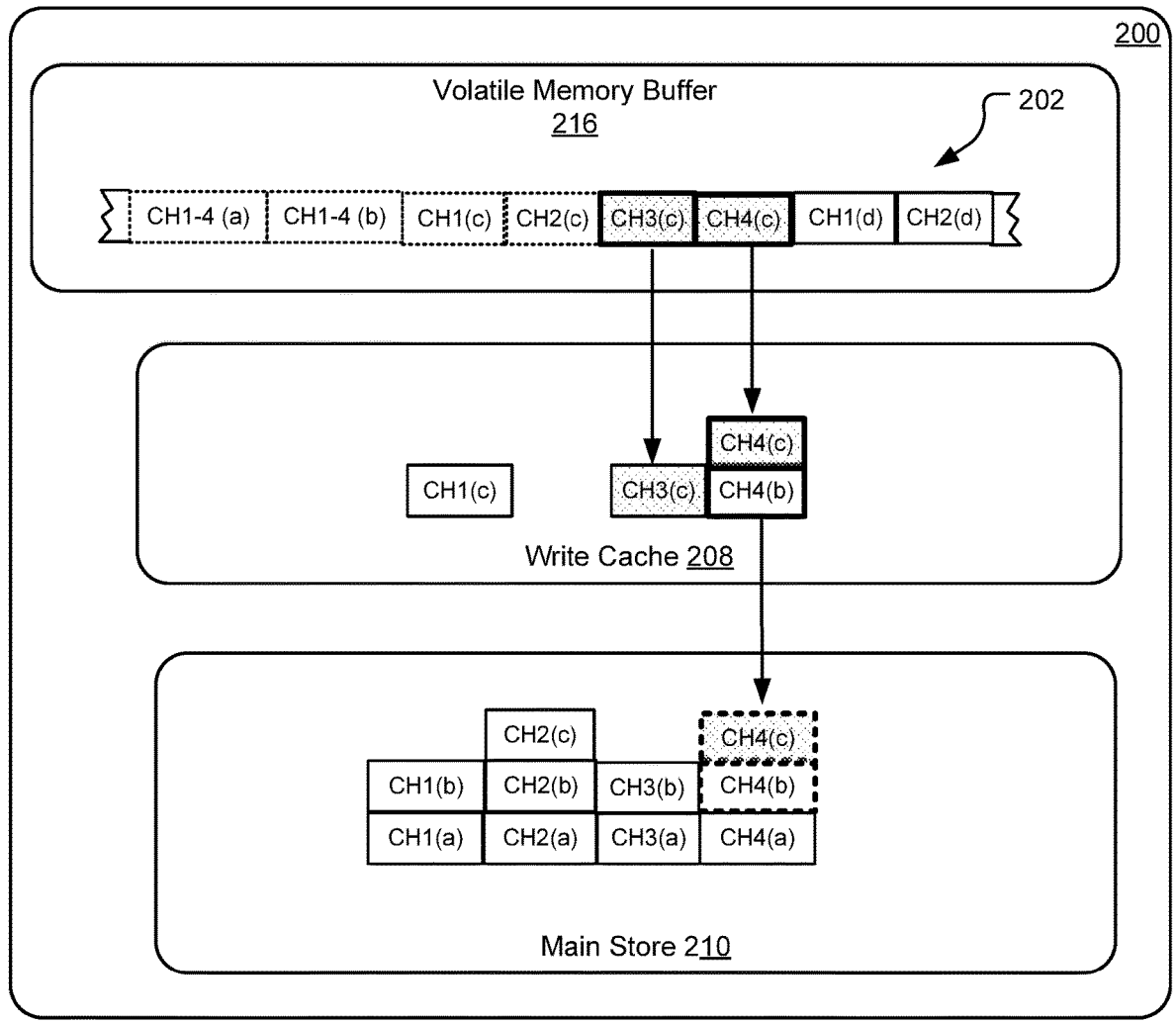
FIG. 2E illustrates the storage device of FIG. 2A-2D performing still another data recordation operation during the example process for efficient write cache staging.

FIG. 2E illustrates the storage device 200 during data recordation operations performed following the operations shown and described with respect to FIG. 2D. Here, the storage device determines initial non-volatile storage locations for the next two sequentially-received channel segments (CH3(c) and CH4(c)) that are included within the multi-channel data stream 202 and pending in the volatile memory buffer 216. Responsive to a determination that these segments are continuation segments, the controller selectively writes each of these segments to the write cache 208.

Following the write of the segment CH4(c) to the write cache 208, the controller determines that a current number of continuous CH4 segments residing in the write cache 208 satisfies the coalescence threshold. Consequently, these same-channel continuation segments (CH4(b) and CH4(c)) are flushed out of the write cache 208 and written to corresponding LBA locations in the main store 210. The continuation segments CH1(c) and CH3(c) remain in the write cache 208.

Figure 2F:
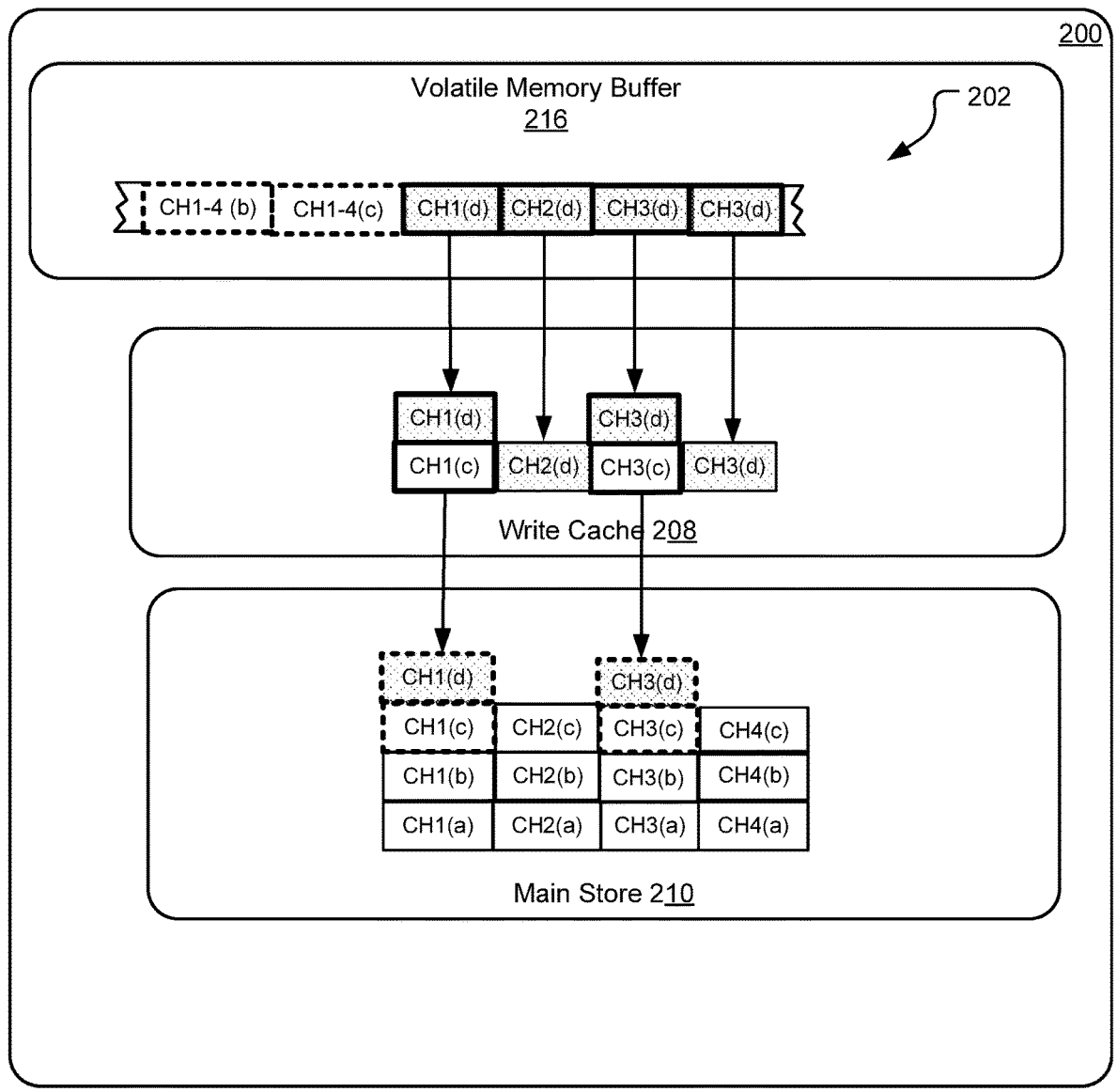
FIG. 2F illustrates the storage device of FIG. 2A-2E performing still another data recordation operation during the example process for efficient write cache staging.

FIG. 2F illustrates the storage device 200 during data recordation operations performed following the operations shown and described with respect to FIG. 2E. Here, the storage device determines initial non-volatile storage locations for the next four sequentially-received channel segments (CH1(d), CH2(d), CH3(d), and CH4(d)) that are included within the multi-channel data stream 202 and pending in the volatile memory buffer 216. Responsive to a determination that these segments are continuation segments (as opposed to initially-received channel segments), the controller selectively sequentially writes each one of these four segments to the write cache 208.

Following the write of the segment CH1(d) to the write cache 208, the controller determines that a current number of continuous CH1 segments residing in the write cache 208 again satisfies the coalescence threshold. Consequently, the segments CH1(c) and CH1(d) are flushed out of the write cache 208 and written to corresponding LBA locations in the main store 210. Likewise, following the write of the segment CH3(d) to the write cache 208, the controller determines that a current number of continuous CH3 segments residing in the write cache 208 satisfies the coalescence threshold. Consequently, the segments CH3(c) and CH3(d) are flushed out of the write cache 208 and written to corresponding LBA locations in the main store 210. At this point in time, the segments CH2(d) and CH3(d) are the only segments in the write cache 208 that have not yet been copied to their corresponding, permanent locations in the main store 210.

The above-described cache staging and flushing of coalesced same-channel segments may be continued until all data of the multi-channel data stream is stored in non-volatile memory. In this example, each of the writes to the main store 210 has a size of two channel segments except for the initial writes (discussed with respect to FIG. 2A), which have a size of one channel segment. The average write size is, over time, two channel segments even if the write cache 208 is not large enough to hold N segments, where N is the number of channels in the multi-channel stream 202. (Note, in the illustrated example, the write cache 208 is sized to hold a maximum of 2 segments nominally (N/2 when the number of channels N, is 4). In addition to the nominal write capacity of N/2, two additional segments are needed to support the instantaneous capacity shown in FIG. 2D (wherein CH(1) has arrived, followed by the arrival with flush for CH2(b) and CH2(c), after which the write cache 208 again stores the nominal number of segments, N/2). For larger N, the instantaneous maximum requirement of N/2+2 may be typically expressed as N/2.

Figure 3:
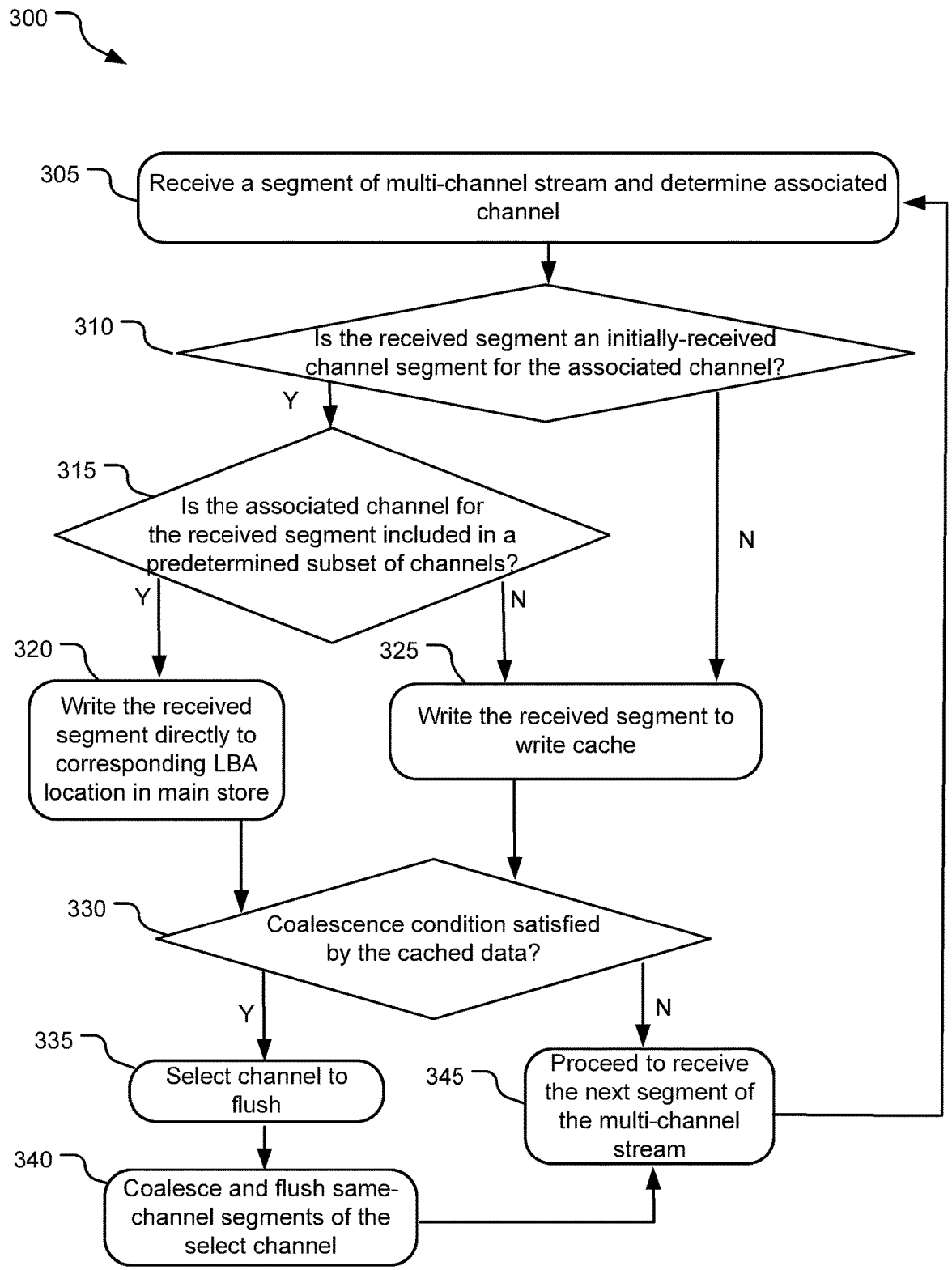
FIG. 3 illustrates example caching operations for increasing write throughput when recording data received as part of a multi-channel data stream.

FIG. 3 illustrates example caching operations 300 for increasing write throughput when recording data received as part of a multi-channel data stream. A receiving operation 305 receives a segment of the multi-channel stream and identifies a channel associated with the segment (referred to below as "the associated channel"). A determination operation 310 determines whether the received segment is an initially-received segment for the associated channel.

If the determination operation 310 determines that the received segment is an initially received segment for the associated channel, another determination operation 315 determines whether the associated channel is included in a predefined subset of channels. If the associated channel is included within the predefined subset of channels, a writing operation 320 writes the segment directly to its corresponding LBA location in the main store without writing the segment to the write cache. If, in contrast, the determination operation 315 determines that the associated channel is not included in the predefined subset of channels, a writing operation 325 writes the segment the write cache (and not yet to its corresponding main store location).

In one implementation, the "predetermined subset of channels" includes channels corresponding to alternating (e.g., every-other) segment in the multi-channel stream. For example, the predetermined subset of channels may include even-numbered channels or odd-numbered channels. In this case, half of the initially-received channel segments are directed to the main store (e.g., the odd channels), while other half of the initially-received channel segments are directed to the write cache (e.g., the even channels).

If the determination operation 310 determines that received segment is not an initially-received segment for the associated channel (e.g., the segment is a continuation segment of a previously-received segment), the writing operation 325 writes the received segment to the write cache. Thus, in one implementation, all continuation segments are written to the write cache.

Following the write of the received segment (by either write operations 320 or 325), a determination operation 330 determines whether a coalescence condition is satisfied for the associated channel by data currently stored in the write cache. In one implementation, the coalescence threshold is satisfied when there exist a threshold number of continuous segments for the associated channel residing in the write cache. In another implementation, the coalescence threshold is satisfied when there exists a threshold quantity of data in the write cache, such as when the write cache has a remaining available capacity that is equal to or less than a set threshold.

If the determination operation 330 determines that the coalescence condition is satisfied, a selection operation 335 selects a channel to coalescence and flush from the write cache. In an implementation where the coalescence condition is satisfied when there exists a threshold quantity of same-channel data residing in the write cache, the selection operation 335 selects the channel for which the cached same-channel data satisfies the threshold. In still another implementation where the coalescence condition is satisfied when a total quantity of cached data exceeds a threshold, the selection operation 335 may select the channel with the largest amount of cached channel data and/or the channel that is expected to update the furthest in the future.

Following the selection operation 335, a flushing operation 340 flushes same-channel segments of the selected channel from the write cache to their associated main store LBA locations, thereby freeing up storage capacity in the write cache. If the determination operation 330 determines that the coalescence condition is not satisfied by the data residing in the write cache, the selection operation 335 and the flushing operation 340 are skipped. In either case, a proceeding operation 345 proceds back to the receiving operation 305, to receive the next segment of the multi-channel stream. The operations 300 repeat until the last segment in the multi-channel chain is selected and written to non-volatile memory.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method for efficiently recording data received as part of a multi-channel data stream, the method comprising:
   for each channel of the multi-channel data stream identified as associated with a first subset of channels, writing an initially-received channel segment to a corresponding main store location instead of a write cache;
   for each channel of the multi-channel stream identified as associated with a second subset of channels, writing an initially-received channel segment to a write cache instead of a corresponding main store location;
   writing continuation channel segments for at least one channel of the first subset and at least one channel of the second subset to the write cache; and
   flushing a collection of same-channel segments of the multi-channel stream out of the write cache responsive to a determination that data in the write cache satisfies a coalescence condition.

2. The method of claim 1, wherein the coalescence condition is satisfied when a collective data size of the same-channel segments satisfies a threshold quantity.

3. The method of claim 2, wherein the write cache has a size that is too small to store the threshold quantity of data for each one of the channels in the multi-channel stream simultaneously.

4. The method of claim 1, wherein the coalescence condition is satisfied when a total quantity of data in the write cache exceeds a threshold and wherein flushing the collection of same-channel segments includes flushing same-channel segments of a data channel having a largest quantity of data in the write cache when the coalescence condition is satisfied.

5. The method of claim 1, wherein flushing the collection of same-channel segments further comprises flushing the collection of same-channel segments to physical data blocks mapped to corresponding host-specified logical block address (LBA) locations.

6. The method of claim 1, wherein flushing the same-channel segments further comprises writing the same-channel segments to a storage device main store and in an LBA-consecutive order.

7. The method of claim 1, wherein flushing the same-channel segments from the write cache further comprises copying the same-channel segments from a solid state storage media to a magnetic storage media.

8. The method of claim 1, wherein the multi-channel data stream includes channel segments of the first subset of channels sequentially interlaced with channel segments of the second subset of channels.

9. A storage system comprising:
   a write cache mapped to solid state storage media locations;
   a main store mapped to magnetic media storage locations;
   a storage device controller configured to:
      receive a multi-channel data stream including data segments of a first subset of channels and a second subset of channels;
      for each channel identified as associated with the first subset of channels, write an initially-received channel segment to a corresponding location in the main store instead of the write cache;
      for each channel identified as associated with the second subset of channels, write an initially-received channel segment to the write cache instead of the main store;
      write continuation channel segments for at least one channel of the first subset and at least one channel of the second subset to the write cache; and
      flush a collection of same-channel segments of the multi-channel stream out of the write cache responsive to a determination that data in the write cache satisfies a coalescence condition.

10. The storage system of claim 9, wherein the coalescence condition is satisfied when a collective data size of the same-channel segments satisfies a threshold quantity.

11. The storage system of claim 10, wherein the write cache has a size that is too small to simultaneously store the threshold quantity of data for each one of the channels in the multi-channel stream simultaneously.

12. The storage system of claim 9, wherein the coalescence condition is satisfied when a total quantity of data in the write cache exceeds a threshold and wherein flushing the collection of same-channel segments includes flushing same-channel segments of a data channel having a largest quantity of data in the write cache when the coalescence condition is satisfied.

13. The storage system of claim 12, wherein flushing the collection of same-channel segments includes flushing same-channel segments of a data channel that is expected to be next appended to at a time furthest in the future.

14. The storage system of claim 9, wherein the storage device controller flushes the collection of same-channel segments by writing the collection of same-channel segments to physical data blocks mapped to corresponding host-specified logical block address (LBA) locations.

15. The storage system of claim 9, wherein the storage device controller flushes the collection of same-channel segments by writing the same-channel segments to a main store of the storage device and in an LBA-consecutive order.

16. The storage system of claim 9, the storage device controller flushes the collection of same-channel segments by writing copying the same-channel segments from a solid state storage media to a magnetic storage media.

17. The storage system of claim 9, wherein the write cache includes volatile memory.

18. The storage system of claim 9, wherein the write cache includes non-volatile memory.

19. One or more non-transitory computer-readable storage media encoding computer-executable instructions for executing on a computer system a computer process for efficiently recording data received as part of a multi-channel data stream, the computer process comprising:
- for each channel of the multi-channel stream identified as associated with a first subset of channels, writing an initially-received channel segment to a corresponding main store location instead of a write cache;
- for each channel of the multi-channel stream identified as associated with a second subset of channels, writing an initially-received channel segment to a write cache instead of a corresponding main store location;
    - writing continuation channel segments for at least one channel of the first subset and at least one channel of the second subset to the write cache; and
    - flushing a collection of same-channel segments of the multi-channel stream out of the write cache responsive to a determination that data in the write cache satisfies a coalescence condition.

20. The one or more non-transitory computer-readable storage media of claim 19 wherein flushing the collection of-same channel segments further comprises:
- flushing the collection of same-channel segments of the multi-channel stream out of the write cache responsive to a determination that same-channel segments satisfy a coalescence condition.

* * * * *